3,085,993
POLYURETHANE PLASTICS
Julius Peter, Odenthal, and Karl-Ludwig Schmidt and Erwin Müller, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Nov. 4, 1958, Ser. No. 771,733
Claims priority, application Germany Nov. 9, 1957
5 Claims. (Cl. 260—75)

The present invention relates to a process for the manufacture of polyurethane plastics and, more particularly, to the production of polyurethane plastics of high molecular weight by polymerization with organic peroxides.

It has been known heretofore to manufacture polyurethane plastics by reacting a compound having reactive hydrogen atoms and a molecular weight of at least about 1,000 with an organic polyisocyanate with the subsequent addition of a compound having reactive hydrogen atoms and a molecular weight of less than 1,000 which is ethylenically unsaturated. The resultant product which contains double bonds is soluble in suitable solvents. The products are polymerized or cross-linked by the addition of organic peroxides into polyurethane plastics of high molecular weight. However, the polyurethane plastics thus provided contain residual double bonds and the products are susceptible to aging because of their presence. Therefore, these products have not been satisfactory in applications where resistance to aging is required.

It is an object of the invention to provide a process for the manufacture of novel polyurethane plastics. It is another object of the invention to provide polyurethane plastics which exhibit an improved resistance to aging. A further object of the invention is to provide a process for the manufacture of polyurethane plastics of high molecular weight which are resistant to aging. A still further object of the invention is to provide polyurethane plastics of high molecular weight which may be used to advantage for applications where resistance to aging is required.

The above objects and others are accomplished, generally speaking, in accordance with the invention by reacting an organic compound having at least two reactive hydrogen atoms capable of reacting with an isocyanate group and a molecular weight of at least about 1,000, organic polyisocyanates and, preferably, cross-linking agents which are organic compounds having at least two reactive hydrogen atoms capable of reacting with an isocyanate group and a molecular weight of less than 1,000, wherein at least one of said reactants contain a methylene group or a substituted methylene group which is a member of a cycloaliphatic ring and which ring is bonded to an aromatic ring.

The invention is predicated upon the surprising discovery that polyurethane plastics of high molecular weight may be obtained from the aforementioned reaction products containing a methylene group as above defined by polymerization with the addition of an organic peroxide. The products thus obtained are superior to the heretofore known polyurethane plastics because of the absence of residual carbon-carbon double bonds and their resultant disadvantageous aging characteristics.

The methylene group referred to above may be illustrated by the formula

wherein R is a member of the group consisting of a hydrogen atom, a hydrocarbon radical, and a substituted hydrocarbon radical, in so long as the group is a member or constituent of a cycloaliphatic ring, which cycloaliphatic ring is bonded to an aromatic ring.

Examples of compounds containing the methylene group, which may be a substituted methylene group are, for example, compounds having at least two reactive hydrogen atoms and a molecular weight of less than about 1,000, having the following formulae:

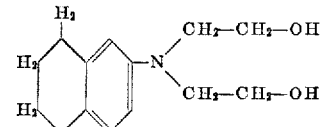

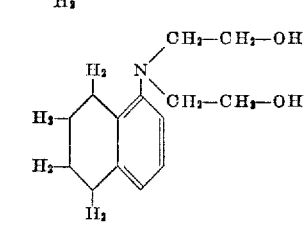

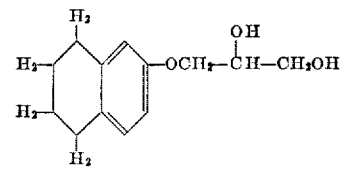

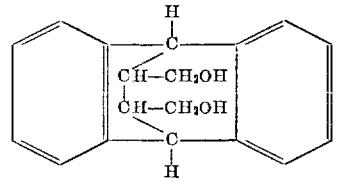

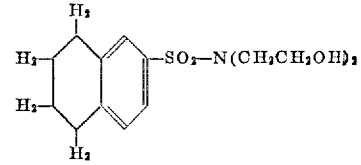

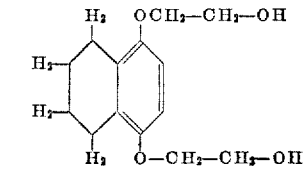

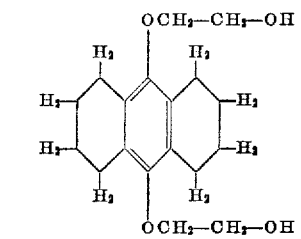

Compounds as listed hereinbefore can be prepared from the well known phenols or amines by condensation with alkylene oxides, such as ethylene oxide, or with glycol chlorhydrin under conditions known in the art.

Examples of organic polyisocyanates which contain a methylene group or substituted methylene group, which is a member of a cycloaliphatic ring, which ring is bonded to an aromatic ring are as follows:

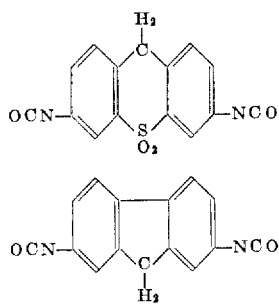

These diisocyanates are described in Siefken, Annalen 562, 75 (1949).

It is to be understood that any suitable compound having the grouping

as above defined may be used in accordance with the invention including those listed hereinbefore.

Any suitable compound having reactive hydrogen atoms and a molecular weight of at least about 1,000 may be used in accordance with the present invention including, for example, polyalkylene ether glycols and their branched polyaddition products, polyesters, polythioethers having terminal hydroxyl groups, and polyester amides. Polyalkylene ether glycols may be prepared by condensing at elevated temperatures with for instance an alkaline catalyst, e.g. sodium hydroxide, or with a boron complex, e.g. boron trifluoride etherate, any suitable alkylene oxide having from two to five carbon atoms, such as, for example, ethylene oxide, propylene oxide, butylene oxide, amylene oxide, or mixtures thereof. The alkylene oxides may be condensed in the presence of other suitable compounds, such as, for example, 1,4-butylene glycol, glycerine, trimethylol propane, castor oil, and the like to provide branched polyhydroxyl compounds. It is to be understood that the term "polyalkylene ether glycol" is intended to include the tetramethylene ether glycol prepared by polymerization of tetrahydrofuran. Any suitable polyester having reactive hydrogen atoms and a specific gravity within the range of about 0.02 to 1.4 may be used in accordance with the present invention. Useful polyesters may be obtained by condensing any polybasic (preferably, dibasic carboxylic) organic acid, such as, adipic, sebacic, isophthalic, terephthalic, oxalic, malonic, succinic, etc., with polyalcohols, such as, ethylene glycol, 1,2-propylene glycol, diethylene glycol, pentaglycol, glycerol, sorbitol, triethanolamine, and the like. Indeed, any organic compound having reactive hydrogen atoms and a molecular weight of at least about 1,000 may be used, such as, for example, polyalkylene ether glycols, or their branched polyaddition products, polyesters, polyester amides, and the like, as well as polythioether glycols, which may be prepared by condensing thiodiglycols with a suitable polyhydric alcohol, such as, ethylene glycol, in the presence of a catalyst.

It is to be understood that any of the above compounds having reactive hydrogen atoms and a molecular weight of at least 1,000 may have, if desired, incorporated therein by condensation any of the heretofore mentioned polyhydroxyl compounds with a molecular weight less than 1,000 which contain a methylene group which is a member of a cycloaliphatic ring, which ring is bonded to an aromatic ring.

Any suitable organic polyisocyanate may be used in accordance with the present invention, such as, for example, tetramethylene diisocyanate, hexamethylene diisocyanate, m-xylylene diisocyanate, p-xylylene diisocyanate, 4,6-dimethyl-1,3-xylylene diisocyanate, cyclohexane-1,4 - diisocyanate, dicyclohexylmethane-4,4'-diisocyanate, m-phenylene diisocyanate, p-phenylene diisocyanate, tolylene diisocyanate, 3-(alpha-isocyanato-ethyl)-phenyl isocyanate, 1-alkyl benzene-2,6-diisocyanate, 2,6-diethyl benzene-1,4-diisocyanate, 1,5-naphthalene diisocyanate, diphenyl methane-4,4'-diisocyanate, diphenyl dimethyl methane-4,4'-diisocyanate, 3,3'-dimethoxy diphenyl methane-4,4'-diisocyanate, and the like.

Any suitable activator may be used to accelerate the formation of the cellular polyurethane plastics provided by this invention. Suitable activators include N-methyl morpholine or N-ethyl morpholine, the tertiary amines (either individually or in mixtures) such as, dimethylhexahydroaniline, diethylhexahydroaniline, reaction products of N,N-diethylaminoethanol and phenylisocyanate, esteramines, etc. Also sodium phenolates added with suitable plasticizers may be employed with the manufacture of cellular polyurethane plastics.

In addition, additives which control the cell size of the cellular polyurethane to insure that a uniform density is obtained may be used. Particularly suitable additives are the silicone oils. Any suitable liquid organic polysiloxane may be used as a silicone oil provided the viscosity thereof is from about 10 to about 500 centistokes at 20° C. Examples of siutable silicone oils include dimethyl siloxane polymers having a viscosity of about 50 centistokes, dimethyl siloxane polymers having a viscosity of about 140 centistokes, and dimethyl siloxane polymers having a viscosity of about 440 centistokes at 20° C., and mixtures thereof.

Any suitable cross-linking agent may be used in accordance with the present invention. Suitable cross-linking agents are compounds having reactive hydrogen atoms and a molecular weight of less than about 1,000, such as, for example, ethylene glycol, diethylene glycol, glycerol, 1,4-butylene glycol, glycerine, trimethanol propane, pentaerythritol, ethylene diamine, diethylene triamine, triethanol amine, 1,2-propanediol, 1,3-propanediol, 1,3-butanediol, 1,4-butanediol, the pentanediols, the hexanediols, and the cycloaliphatic diols, such as, for example, quinitol, and the like.

Any suitable organic peroxide may be used in accordance with the invention. Examples of suitable organic peroxides are dicumyl peroxide, benzoyl peroxide, cyclohexanone hydroperoxide, diacetyl peroxide, and succinyl peroxide.

The reaction product suitable for cross-linking or polymerization with an organic peroxide may be prepared by any of the known prior art methods. For example, a compound having a molecular weight of at least about 1,000, and containing active hydrogen atoms may be reacted with an excess of an organic diisocyanate calculated on the reactive hydrogen atoms. The reaction product is a compound having free NCO groups and this may be reacted with a compound having active hydrogen atoms and a molecular weight of less than 1,000. This compound is added in a quantity so that the amount of reactive hydrogen atoms is equal to or slightly in excess of the amount required to react with all of the said free NCO groups.

In another procedure, the compound containing active hydrogen atoms and having a molecular weight of at least about 1,000 may also be mixed with a compound having reactive hydrogen atoms and a molecular weight less than about 1,000 and a substantially equivalent quantity of an organic polyisocyanate corresponding to the sum of the reactive hydrogen atoms present.

According to still another procedure, the compound having reactive hydrogen atoms and a molecular weight of at least about 1,000 can be reacted with an equivalent quantity of an organic polyisocyanate.

In any event, it is necessary in accordance with the invention that at least one of the reactants contain the grouping at least once in the molecule

wherein R is a member selected from the group consisting of a hydrogen atom, a hydrocarbon radical, and a substituted hydrocarbon radical. The grouping is a member of a cycloaliphatic ring to which an aromatic ring is bonded.

The organic peroxide is added to the rotatable thermoplastic reaction products in quantities of 1% to about 10% by weight. The organic peroxides in the form of a paste or powder have proved to be particularly useful. The organic peroxides are incorporated by mixing into the thermoplastic reaction product at room temperatures and by using conventional mixing apparatuses, for example, on rubber mixing rollers. In this step it is also possible to incorporate the fillers, such as, carbon black or lubricants and the like. The final polymerization or cross-linking occurs after shaping or simultaneously therewith during vulcanization conditions which are temperatures of at least about 100° C.

The polyurethane plastics of high molecular weight provided in accordance with the invention are useful in the manufacture of articles, such as, automobile tires, gaskets, conveyor belts, and the like, especially in those applications where high tensile strength, abrasion resistance, and resistance to aging is required.

The invention will be further understood by the following example in which the parts are parts by weight:

*Example 1*

About 100 parts by weight of polybutylene glycol with an OH number of about 43 are dehydrated in a stirrer-type vessel for 30 minutes at about 130° C. under a water-pump vacuum. About 10 parts by weight of dihydroxy-ethyl-5,6,7,8-tetrahydronaphthylamine-(2) are added and the mixture stirred until a homogeneous solution is obtained. Then 14 parts by weight of tolylene diisocyanate are mixed therewith. The temperature rises from 130° C. up to about 150° C. Stirring is continued for another 3 to 5 minutes and the mixture is then poured onto sheet metal plates and heated for 12 hours in a drying chamber at 100–110° C. The result is a thermoplastic material which can be rolled.

About 100 parts by weight of the initial condensate thus obtained are mixed on a rubber roller with 30 parts by weight of active carbon black, 1 part by weight of stearic acid and 8 parts by weight of 40% dicumyl peroxide and rolled out as a sheet which is vulcanized under a press for 30 minutes at 150° C. A vulcanisate having the following mechanical properties is obtained:

Tensile strength _____ kg./cm.$^2$__ 170
Breaking elongation _____ percent__ 620
Impact elasticity _____ do____ 45
Shore hardness _____ degree___ 52
Permanent elongation after 1 minute _____ percent__ 10
Stress valve with 300% elongation _____ kg./cm.$^2$__ 59
Stress value with 500% elongation _____ kg./cm.$^2$__ 132

It is to be understood that any of the aforementioned compounds having reactive hydrogen atoms and a molecular weight of at least about 1,000 may be substituted in the above example and that any of the above listed organic polyisocyanates may also be substituted. Likewise, any of the above compounds having a molecular weight of less than 1,000 and reactive hydrogen atoms which contain the grouping

as above defined may be used instead of the compound named.

It is also to be understood that any one of the reactants in the above example may have the grouping

as above defined, instead of the reactant which is a compound having reactive hydrogen atoms and a molecular weight of less than about 1,000.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method for making a polyurethane plastic which comprises reacting an organic polyisocyanate with an organic compound having hydroxyl groups and a molecular weight of at least about 1,000, said organic compound being capable of reacting with said organic polyisocyanate to form a polyurethane and being selected from the group consisting of (A) a polyester prepared by esterification of a dicarboxylic acid and a polyhydric alcohol comprising a member selected from the group consisting of:

(1)

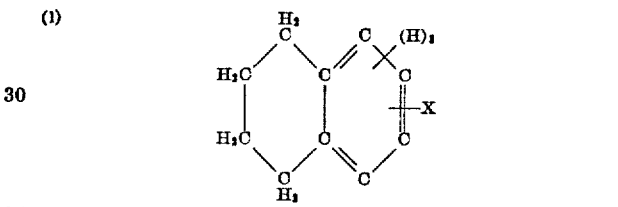

wherein X is an aliphatic radical containing at least 2 hydroxyl groups;

(2)

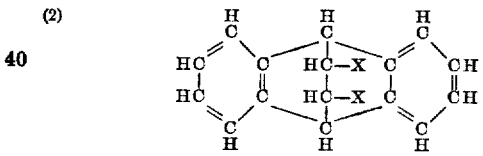

wherein X is an aliphatic radical containing at least one hydroxyl group;

(3)

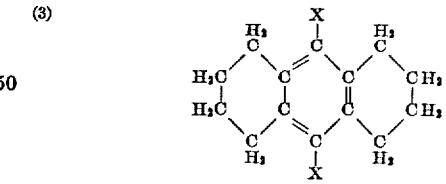

wherein X is an aliphatic radical containing at least one hydroxyl group;

(4)

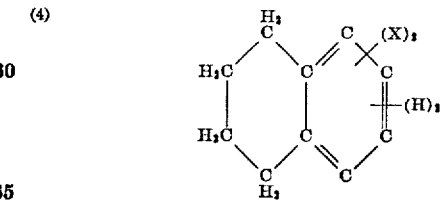

wherein X is an aliphatic radical having at least one hydroxyl group; (B) a polyalkylene ether prepared by condensation of an alkylene oxide with a polyhydric alcohol comprising a member selected from the group consisting of (1), (2), (3) and (4) above; and curing the resulting product by heating it to a temperature of at least about 100° C. in the presence of an organic peroxide.

2. A method for making a polyurethane plastic which comprises reacting an organic polyisocyanate selected from the group consisting of;

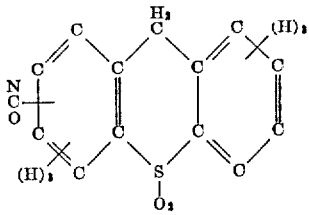

and

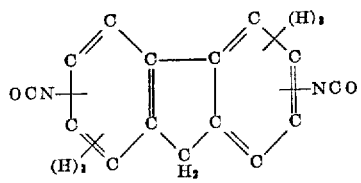

with an organic compound having hydroxyl groups and a molecular weight of at least about 1,000, said organic compound being capable of reacting with said organic polyisocyanate to form a polyurethane, and curing the resulting product by heating it to a temperature of at least about 100° C. in the presence of an organic peroxide.

3. A method for making a polyurethane plastic which comprises reacting an organic polyisocyanate and an organic compound having hydroxyl groups and a molecular weight of at least about 1,000, said organic compound being capable of reacting with said organic polyisocyanate to form a polyurethane, and a cross-linking agent selected from the group consisting of;

(1)

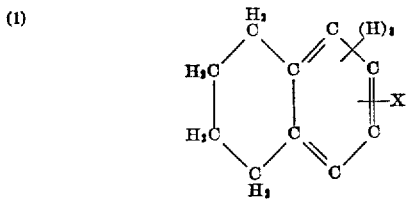

wherein X is an aliphatic radical containing at least 2 hydroxyl groups;

(2)

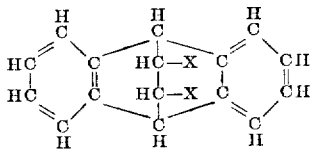

wherein X is an aliphatic radical containing at least 1 hydroxyl group;

(3)

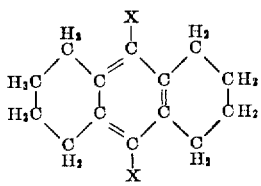

wherein X is an aliphatic radical containing at least 1 hydroxyl group;

(4)

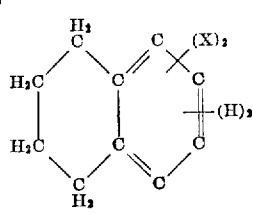

wherein X is an aliphatic radical having at least 1 hydroxyl group; and curing the resulting product by heating it to a temperature of at least about 100° C. in the presence of an organic peroxide.

4. The process of claim 3 wherein the organic peroxide is dicumyl peroxide.

5. The process of claim 3 wherein the said cross-linking agent is prepared by reaction of anthrazene with butene diol.

References Cited in the file of this patent

UNITED STATES PATENTS

| | | |
|---|---|---|
| 2,431,921 | Cook et al. | Dec. 2, 1947 |
| 2,861,972 | Muller et al. | Nov. 25, 1958 |

FOREIGN PATENTS

| | | |
|---|---|---|
| 1,103,698 | France | May 25, 1955 |
| 896,717 | Germany | Nov. 16, 1953 |
| 1,000,998 | Germany | Jan. 17, 1957 |

OTHER REFERENCES

Curphey: "British Plastics," pages 407–408, October 1954.

UNITED STATES PATENT OFFICE
CERTIFICATE OF CORRECTION

Patent No. 3,085,993                            April 16, 1963

Julius Peter et al.

It is hereby certified that error appears in the above numbered patent requiring correction and that the said Letters Patent should read as corrected below.

Column 7, lines 3 to 13, the formula should appear as shown below instead of as in the patent:

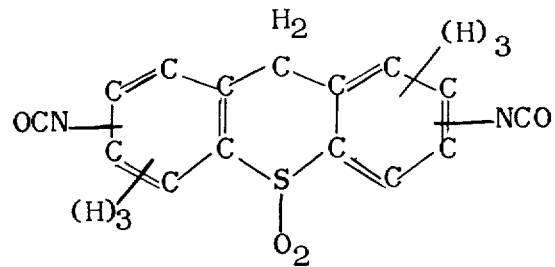

column 8, lines 12 to 19, the formula should appear as shown below instead of as in the patent:

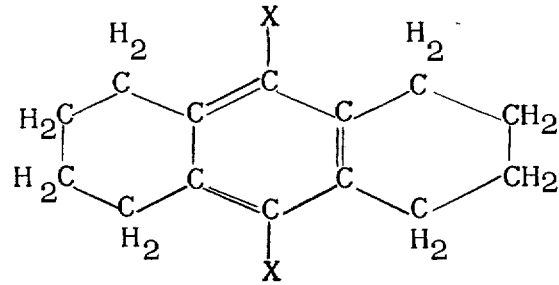

Signed and sealed this 19th day of November 1963.

(SEAL)
Attest:
ERNEST W. SWIDER
Attesting Officer

EDWIN L. REYNOLDS
Acting Commissioner of Patents